(12) United States Patent
Endacott

(10) Patent No.: US 6,838,621 B2
(45) Date of Patent: *Jan. 4, 2005

(54) WIRE CONNECTOR

(76) Inventor: John E. Endacott, 55 Star Lake Dr., Pensacola, FL (US) 32507

( * ) Notice: Subject to any disclaimer, the term of this patent is extended or adjusted under 35 U.S.C. 154(b) by 0 days.

This patent is subject to a terminal disclaimer.

(21) Appl. No.: 10/684,306

(22) Filed: Oct. 11, 2003

(65) Prior Publication Data

US 2004/0074667 A1 Apr. 22, 2004

Related U.S. Application Data

(63) Continuation of application No. 09/245,369, filed on Feb. 5, 1999, now Pat. No. 6,677,529.

(51) Int. Cl.$^7$ ................................ H01R 4/10
(52) U.S. Cl. ................ 174/84 R; 174/88 R; 174/84 C; 174/DIG. 8
(58) Field of Search ............... 174/84 R, 88 R, 174/DIG. 8, 84 C

(56) References Cited

U.S. PATENT DOCUMENTS

| | | | |
|---|---|---|---|
| 2,655,641 A | | 10/1953 | Asaff |
| 3,305,625 A | | 2/1967 | Ellis |
| 3,525,799 A | | 8/1970 | Ellis |
| 3,601,783 A | | 8/1971 | Loose |
| 3,814,139 A | * | 6/1974 | Loyd et al. .................. 138/141 |
| 4,144,404 A | * | 3/1979 | De Groef et al. ......... 174/88 C |
| 4,176,244 A | | 11/1979 | Ramy et al. |
| 4,206,786 A | * | 6/1980 | Wetmore ..................... 138/178 |
| 4,346,145 A | * | 8/1982 | Choi et al. .................. 428/389 |
| 4,576,871 A | * | 3/1986 | Oestreich .................... 428/521 |
| 4,883,925 A | * | 11/1989 | Graf ......................... 174/84 R |
| 4,894,030 A | | 1/1990 | Chavaroux |
| 4,910,090 A | * | 3/1990 | Kuhlman et al. ........... 428/469 |
| 5,221,815 A | * | 6/1993 | Bostock et al. ........... 174/84 R |
| 5,278,354 A | | 1/1994 | Lhomme |
| 5,393,932 A | * | 2/1995 | Young et al. .............. 174/84 R |
| 5,527,612 A | * | 6/1996 | Ohta et al. .................. 428/379 |

* cited by examiner

*Primary Examiner*—Chau N. Nguyen
(74) *Attorney, Agent, or Firm*—Peter Loffler

(57) ABSTRACT

A wire connector for electrically connecting a pair of wires, allows crimping the wires in place and thereafter allows for soldering of the wires. A hollow sleeve, made from heat shrinkable polyolefin with a heat activated adhesive layer, is translucent and tinted and has a tubular-shaped solder member disposed therein. A body member, made from tin plated annealed copper, is disposed within the solder member. The body member has a channel having and a pair of spaced apart hoods the hoods providing a medial opening for visual inspection of the connected wires. A stop member is disposed within the channel. A first wire member is inserted into the channel until it abuts the stop member, while a second wire member, each wire member being either solid or stranded, is inserted into the opposite end of the channel until it abuts the stop member. The first hood and the second hood are each crimped thereby crimping their respective wires. Thereafter, the hollow sleeve is heated causing the solder member to melt and solder the two wires to the body member, while the hollow sleeve heat shrinks and recovers to the wire insulation providing a protective insulator with the adhesive providing a protective barrier.

13 Claims, 2 Drawing Sheets

WIRE CONNECTOR

RELATED APPLICATION

This application is a continuation of application Ser. No. 09/245,369 filed on Feb. 5, 1999 now U.S. Pat. No. 6,677,529.

BACKGROUND OF THE INVENTION

1. Field of the Invention

The present invention relates to a wire connector that crimps, solders, and seals a pair of wires together.

2. Background of the Prior Art

Many devices have been proposed to electrically connect two wires together when the wires are in an end-to-end orientation. U.S. Pat. No. 5,514,836 to Delalle et al., U.S. Pat. No. 5,393,932 to Young et al., U.S. Pat. No. 5,278,354 to Lhomme, U.S. Pat. No. 4,940,179 to Soni, U.S. Pat. No. 4,881,995 to Arenz, U.S. Pat. No. 4,341,921 to Simpson, and U.S. Pat. No. 4,144,404 to De Groef et al., are all examples of such electrical connection devices.

These and other devices in the art suffer from one or more drawbacks. Many devices are relatively complex in construction making them expensive to manufacture and difficult to use. Some devices provide a relatively weak electrical connection that can, over time, fail. Some devices, although providing a sufficiently strong electrical connection, provide a relatively weak mechanical connection that can, over time, fail, resulting in failure of the electrical connection.

Therefore, there is a need in the art for a wire connector that electrically connects two wires in end-to-end orientation that overcomes the above-mentioned drawbacks. Specifically, such a wire connector must be of relatively simple design and construction, must provide a solid electrical as well as mechanical connection of the two wires, and must be easily installed. Ideally, the wire connector will also provide a good insulation seal about the wire connection point.

SUMMARY OF THE INVENTION

The wire connector of the present invention addresses the aforementioned needs in the art. The wire connector connects two wires in end-to-end relation without enduring drawbacks found in the prior art. The present invention provides a wire connector that is of relatively simple and straightforward design that is relatively inexpensive to manufacture and is easy to use. Through the use of a solder and crimpable body member, the wire connector provides a solid electrical and mechanical connection of the two wires to be connected and reduces the likelihood of either mechanical or electrical failure at the point of connection. Furthermore, the wire connector provides a protective insulator and corrosion barrier and allows visual inspection of the resulting connection.

The wire connector of the present invention is comprised of a hollow sleeve, which is at least partially translucent and which may be tinted. The hollow sleeve is made from a heat shrinkable material, such as polyolefin, and has a heat shrink ratio of at least about 2 to 1. The hollow sleeve acts as a protective insulator for the wire connector to prevent electrical shorts and to provide resistance to abrasion of the connected wires. An adhesive element is located within the hollow sleeve, the adhesive element being co-extruded with the hollow sleeve and the adhesive element being heat activated. The adhesive element acts as a barrier to prevent moisture and contaminants from corroding the wire connection. A solder member is disposed within the hollow sleeve, the solder member being a tubular member, being a low temperature solder member, and being a pre-fluxed solder member. A body member, having a first end, a second end, and a channel is disposed within the solder member. A stop member is disposed within the channel. A first hood is secured to the body member proximate the first end while a second hood member is secured to the body proximate the second end in spaced apart relation to the first hood member. The body member is made from annealed copper for easy deformation during crimping and is tin plated to prevent tarnishing and corrosion of the copper and to provide a clean surface during soldering. The body member, including the first hood member and the second hood member is either a seamless extrusion or is brazed along the seam to prevent the body member from opening when crimped

BRIEF DESCRIPTION OF THE DRAWINGS

FIG. 6 is a front sectioned view of the wire connector taken along line 6—6 in FIG. 2.

Similar reference numerals refer to similar parts throughout the several views of the drawings.

DESCRIPTION OF THE PREFERRED EMBODIMENT

Figure 1:
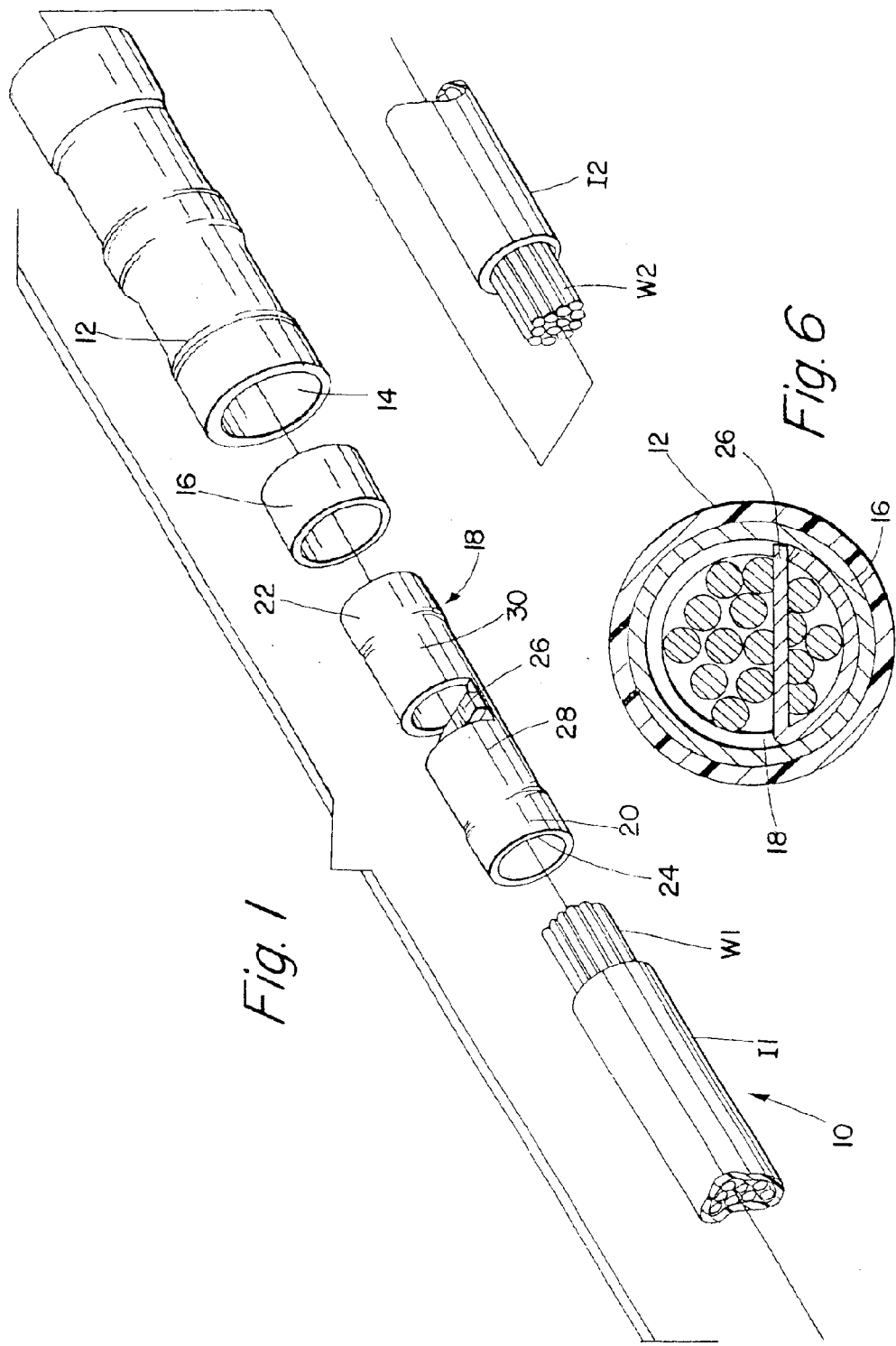
FIG. 1 is an exploded view of the wire connector of the present invention.
Figure 2:
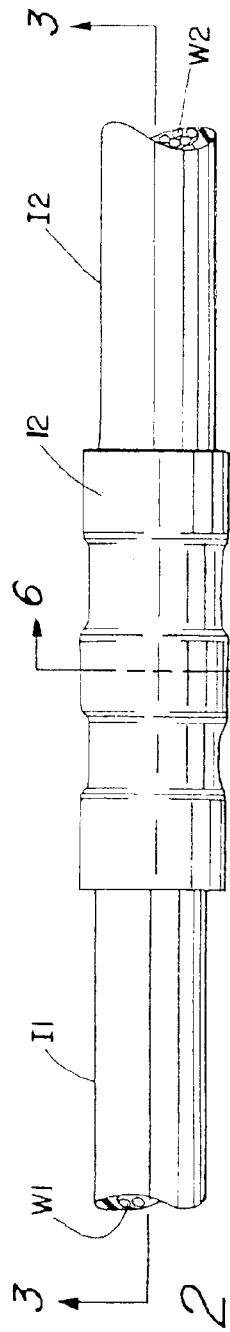
FIG. 2 is a side elevation view of the wire connector.
Figure 3:
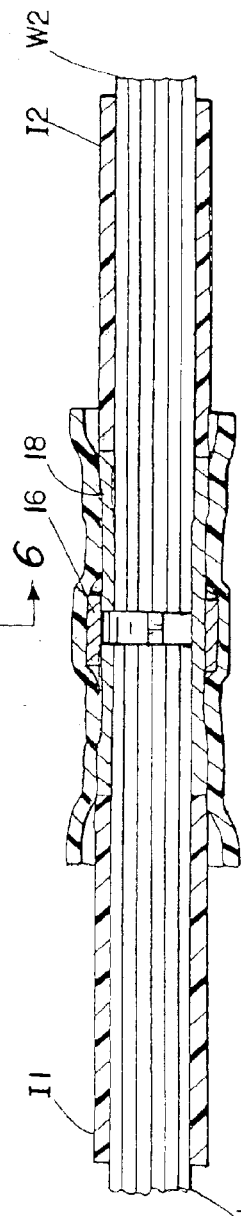
FIG. 3 is a side sectioned view of the wire connector taken along line 3—3 in FIG. 2, showing the initial stage of the wire connection process.
Figure 4:
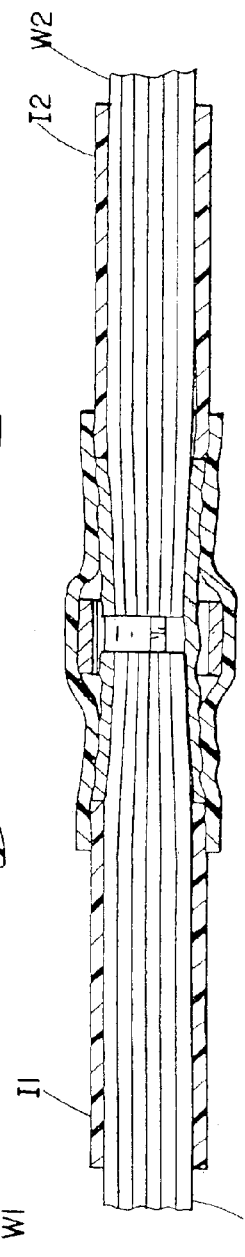
FIG. 4 is a side sectioned view of the wire connector during the medial stage of the connection process.
Figure 5:
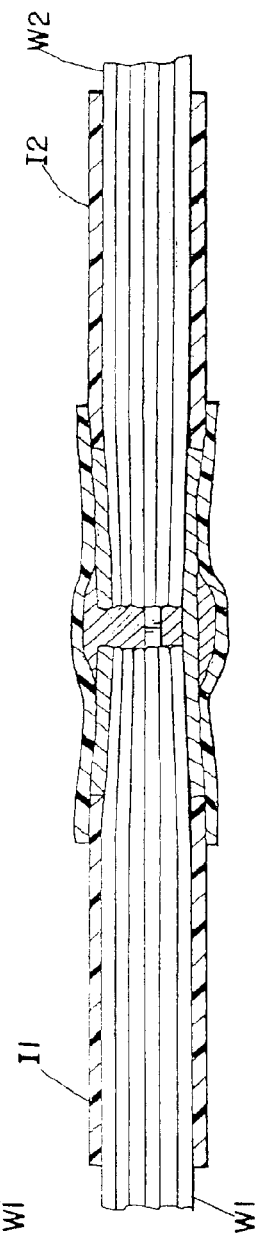
FIG. 5 is a side sectioned view of the wire connector after the final stage of the connection process.

Referring now to the drawings, it is seen that the wire connector of the present invention, generally denoted by reference numeral 10, is comprised of a hollow sleeve 12. The hollow sleeve 12 is at least partially translucent and may be tinted and may also have certain identification indicia printed thereon. The hollow sleeve 12 is made from a heat shrinkable material, such as polyolefin, and has a heat shrink ratio of at least about 2 to 1. As seen, the medial portion of the hollow sleeve is initially at least partially heat shrunk. An adhesive element 14 is located within the hollow sleeve 12, the adhesive element 14 being co-extruded with the hollow sleeve 12, the adhesive element 14 being heat activated.

A solder member 16 is disposed within the hollow sleeve 12, the solder member 16 being a tubular member and being a low temperature solder member, a low temperature solder member being defined as a solder member that melts at a temperature no greater than about 300 degrees Fahrenheit at sea level under normal atmospheric conditions. By using a low temperature solder member 16, the need for special heating devices is eliminated. The solder member 16 is a pre-fluxed solder member, the pre-fluxed nature of the solder member 16 providing a cleansing agent to clean metal surfaces A body member 18, having a first end 20, a second end 22, and a channel 24 is disposed within the solder member 16. A stop member 26 is disposed within the channel 24. A first hood 28 is secured to the body member 18 proximate the first end 20 for enclosing a portion of the channel 24, while a second hood 30 is secured to the body 18 proximate the second end 22 for enclosing a second portion of the channel 24. The body member 18 is made from annealed copper and is tin plated.

In order to use the wire connector 10 of the present invention, a first wire W1 is inserted into the hollow sleeve 12 such that it is received within channel 24 proximate the first end 20. The stop member 26 prevents over-insertion of the first wire W1. A second wire W2 is inserted into the opposing end of the hollow sleeve 12 such that it is received within the channel 24 proximate the second end 22. The stop member 26 prevents over-insertion of the second wire W2. Both the first wire W1 and the second wire W2 may be either solid, or as shown, stranded wire.

Thereafter, the body member 18 is crimped proximate the first end 20 (and thus the first hood 28) in order to crimp the first wire W1 into the body member 18 and is also crimped proximate the second end 22 (and thus the second hood 30) in order to crimp the second wire W2 into the body member 18. As the body member is made from tin-plated annealed copper, ease of crimping is assured to achieve a solid crimp on both wires W1 and W2 that is both electrically and mechanically sound.

Thereafter, heat is applied to the device 10 in order to melt the solder member 16. The solder member 16 melts and flows first into the opening established by the separated first hood 28 and second hood 30 and then into the crimped first wire W1 and the crimped second wire W2. As each wire W1 and W2 are crimped, the solder member 16 can easily flow into the crimped areas defined by the deformed portions of the body member 18. The heating of the device 10 causes the hollow sleeve 12 to shrink, allowing the hollow sleeve to recover around the insulation element I1 and I2 of the first wire W1 and the second wire W2 respectively in order to provide a snug fit of the wires w1 and W2 within the wire connector 10. Additionally, the heating of the device 10 also activates the adhesive element 14 in order to adhere the hollow sleeve 12, to the first insulation element I1, and to the second insulation element I2. This adherence forms a barrier to prevent corrosion of the device 10 and the wires W1 and w2 and also inhibits the entrance of outside contaminants into the system. The hollow sleeve 12 now acts as an insulator of the connected wires W1 and W2, thereby preventing electrical shorts and also providing resistance to abrasion of the connected wires. As the hollow sleeve 12 is translucent, both the crimping process and the soldering process can be visually inspected. The tinting of and the imprinting on the hollow sleeve 12 can be used to indicate the proper wire gauge to be used with a particular wire connector 10. The separation of the first hood 28 and the second hood 30 aids in the visual inspection process and also aids in ease of the solder member 16 flowing into the crimped wires W1 and W2.

While the invention has been particularly shown and described with reference to an embodiment thereof, it will be appreciated by those skilled in the art that various changes in form and detail may be made without departing from the spirit and scope of the invention.

I claim:

1. A wire connector for electrically and mechanically connecting a first wire and a second wire, the wire connector comprising:

a heat shrinkable hollow sleeve;

a solder member disposed within the hollow sleeve;

a crimpable hollow tubular body member having a first end adapted to receive the first wire therethrough, a second end adapted to receive the second wire therethrough, and a medial portion having an opening; and wherein the body member is inserted inside the solder member, a portion of the first wire is inserted into the first end of the body member, a position of the second wire is inserted into the second end of the body member, the first end is crimped and the second end is crimped, and heat is applied to the wire connector until the solder member melts and flows into the portions of the first wire and the second wire via the opening.

2. The wire connector as in claim 1 wherein the hollow sleeve is at least partially translucent.

3. The wire connector as in claim 2 wherein the hollow sleeve is tinted.

4. The wire connector as in claim 1 further comprising an adhesive element located within the hollow sleeve.

5. The wire connector as in claim 4 wherein the adhesive material is heat activated.

6. The wire connector as in claim 1 wherein the heat shrinkable material is polyolefin.

7. The wire connector as in claim 1 wherein the shrink ratio of the heat shrinkable material is at least about 2 to 1.

8. The wire connector as in claim 1 wherein the solder member is generally tubular-shaped and encompasses the body member proximate the opening.

9. The wire connector as in claim 1 wherein the solder member is a low temperature solder member.

10. The wire connector as in claim 1 wherein the solder member is pre-fluxed.

11. The wire connector as in claim 1 further comprising a stop member disposed within the body member proximate the opening.

12. The wire connector as in claim 1 wherein the body member is made from annealed copper.

13. The wire connector as in claim 12 wherein the copper is tin plated.

* * * * *